Figure 1:
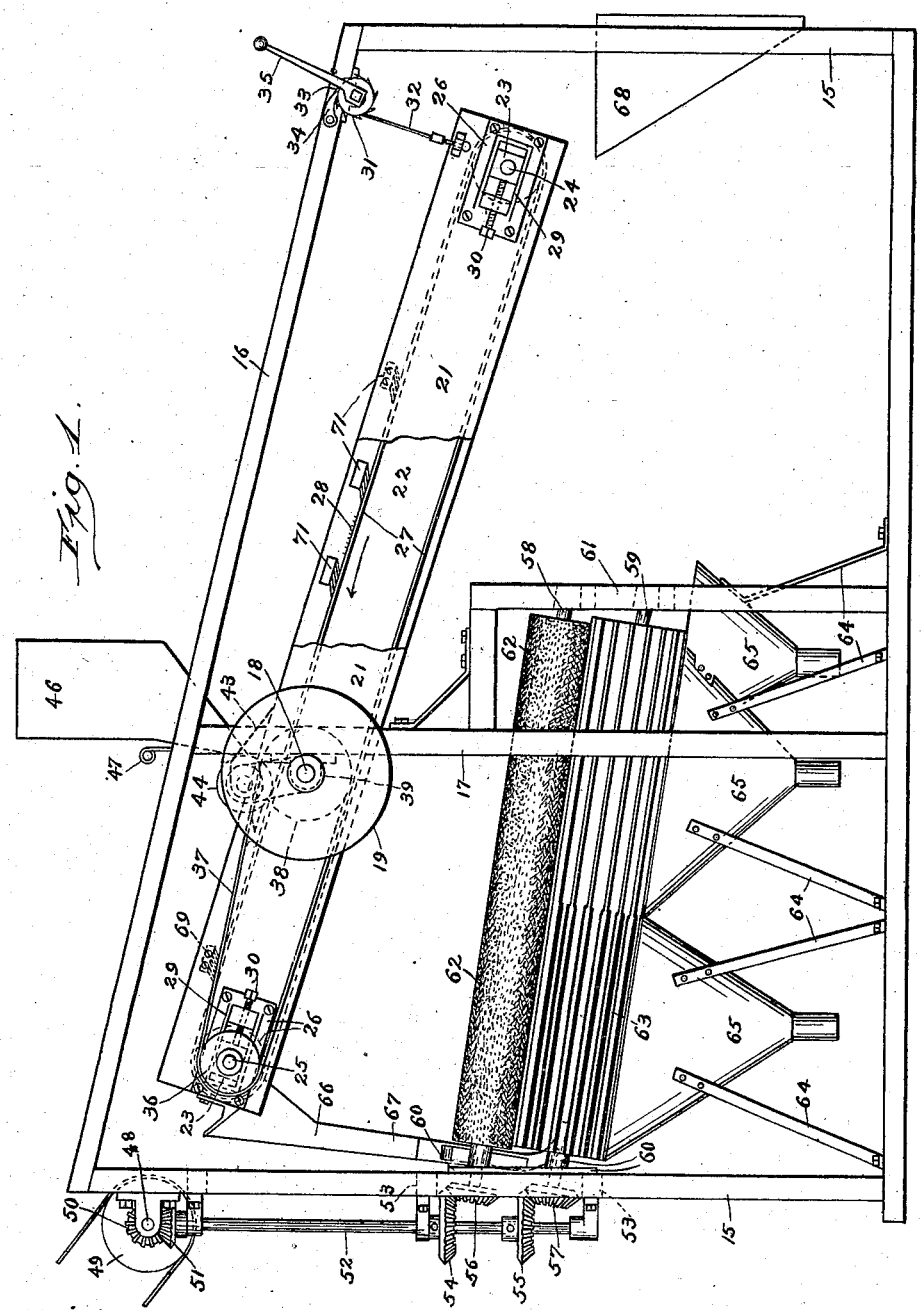

No. 867,276. PATENTED OCT. 1, 1907.
J. JENKINS.
MACHINE FOR SEPARATING AND GRADING COFFEE GRAINS OR BEANS.
APPLICATION FILED JULY 5, 1906.

3 SHEETS—SHEET 1.

Witnesses:
Chas. E. Gorton.
M. A. Nyman.

Inventor:
Jay Jenkins.
By Chas. E. Tillman
Atty.

No. 867,276. PATENTED OCT. 1, 1907.
J. JENKINS.
MACHINE FOR SEPARATING AND GRADING COFFEE GRAINS OR BEANS.
APPLICATION FILED JULY 5, 1906.
3 SHEETS—SHEET 2.
Fig. 2.
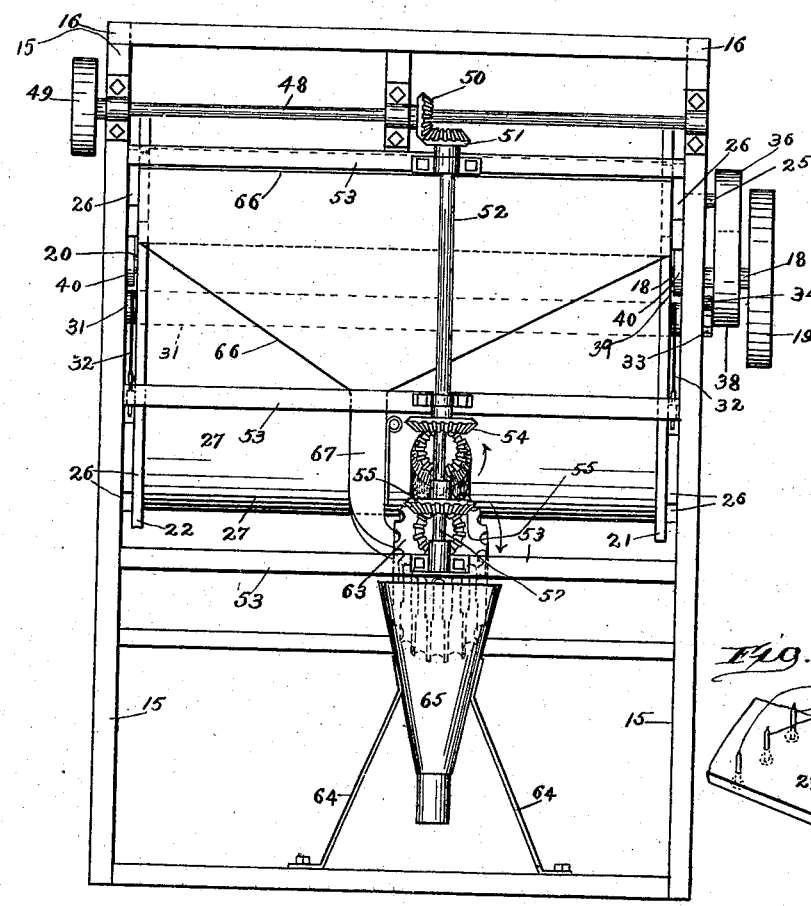
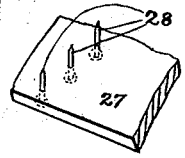
Fig. 13.
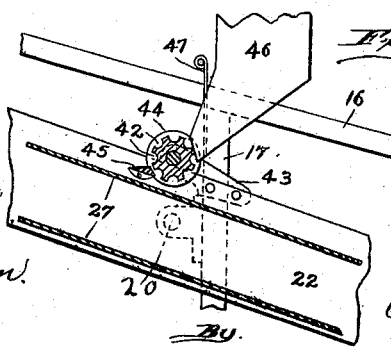
Fig. 12.
Witnesses:
Chas. E. Gorton
M. A. Nyman
Inventor:
Jay Jenkins
Chas. C. Tillman
Atty.

No. 867,276. PATENTED OCT. 1, 1907.
J. JENKINS.
MACHINE FOR SEPARATING AND GRADING COFFEE GRAINS OR BEANS.
APPLICATION FILED JULY 5, 1906.
3 SHEETS—SHEET 3.
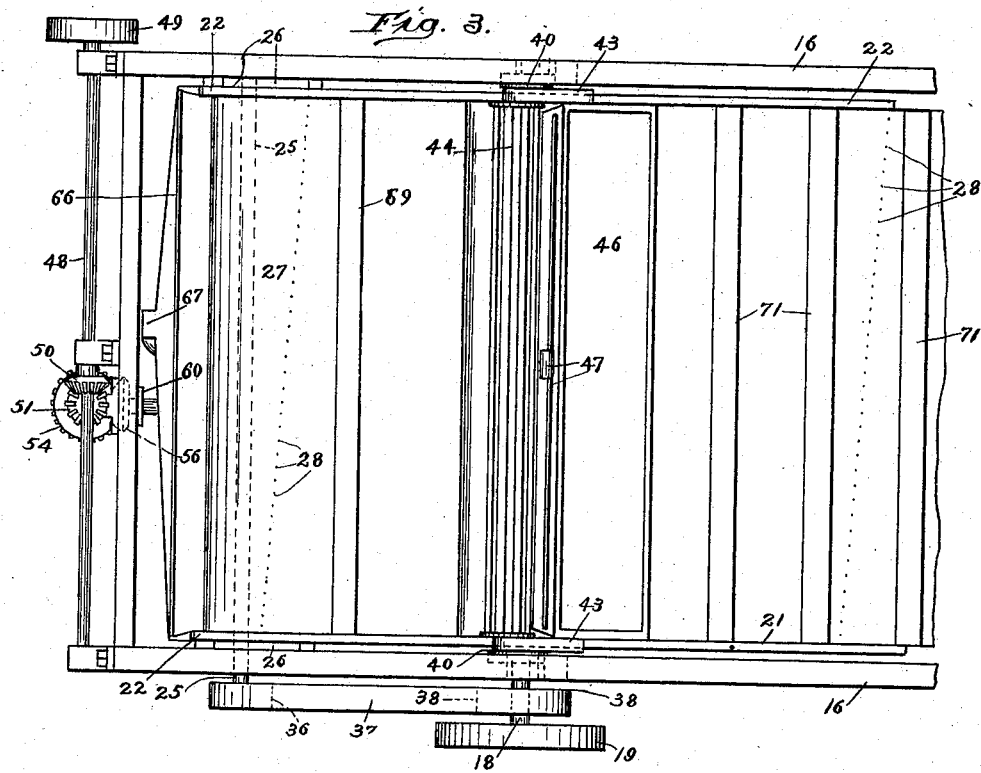
Fig. 3.
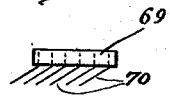
Fig. 4.
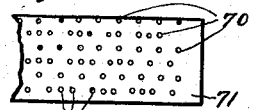
Fig. 5.
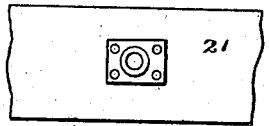
Fig. 6.
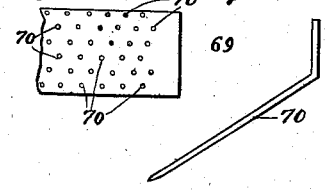
Fig. 9. Fig. 8.
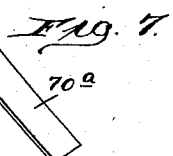
Fig. 7.
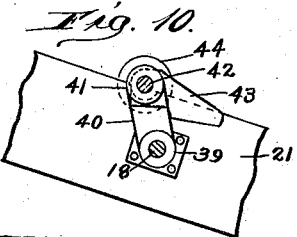
Fig. 10.
Fig. 11.
Witnesses:
Chas. E. Gorton.
M. A. Nyman.
Inventor:
Jay Jenkins.
By Chas. C. Tillman
Atty.

UNITED STATES PATENT OFFICE.

JAY JENKINS, OF CHICAGO, ILLINOIS.

MACHINE FOR SEPARATING AND GRADING COFFEE GRAINS OR BEANS.

No. 867,276.	Specification of Letters Patent.	Patented Oct. 1, 1907.

Application filed July 5, 1906. Serial No. 324,744.

*To all whom it may concern:*

Be it known that I, JAY JENKINS, a citizen of the United States, residing at Chicago, in the county of Cook and State of Illinois, have invented certain new and useful Improvements in Machines for Separating and Grading Coffee Grains or Beans, of which the following is a specification.

This invention relates to improvements in a machine to be used for separating and grading coffee grains or beans, and it consists in certain peculiarities of the construction, novel arrangement, and operation of the various parts thereof, as will be hereinafter more fully set forth and specifically claimed.

As is well known to those skilled in the art to which my invention pertains, that for commercial reasons, it is desirable to separate the round or pea-berry coffee beans or grains from those which have a flat surface, and that it is also desirable to grade the beans or grains or to separate the larger ones from the smaller, and it is the principal object of my invention to provide a combined machine for separating the round or pea-berry beans from the flat-surfaced ones, as well as for grading the grains, which shall be comparatively simple and inexpensive in construction, strong, durable and effective in operation.

In order to enable others skilled in the art to which my invention pertains, to make and use the same, I will now proceed to describe it referring to the accompanying drawings, in which—

Figure 1 is a view in side elevation partially broken away of a machine embodying the invention, showing the parts in position ready for use. Fig. 2 is a view in front elevation thereof. Fig. 3 is a plan view of a portion of the machine. Fig. 4 is a detached end view of one of the transverse bars which carry a series of pins or projections for the purpose of deflecting the grains or beans on the conveyer. Fig. 5 is a plan view of a portion of one of said bars. Fig. 6 is a fragmental side view of a portion of one of the side rails of the conveyer-frame. Fig. 7 is a detached perspective view of one form of the pins used on said cross-bars. Fig. 8 is a similar view of another form thereof. Fig. 9 is a plan view of a portion of one of the cross-bars used in front of the feed roller. Fig. 10 is a side view of a portion of one of the side rails of the conveyer-frame, showing the feed roller journaled thereon and geared to the driving shaft. Fig. 11 is a fragmental view of the corrugated grading roller. Fig. 12 is a view of a portion of the main frame, a part of the conveyer-frame and conveyer, showing the feed roller in section and a portion of the supplying hopper mounted on the main frame;— and—Fig. 13 is a perspective view of a portion of the conveyer.

Like numerals of reference, refer to corresponding parts throughout the different views of the drawings.

The reference numeral 15 designates the main frame, which may be of any suitable size, form and material, but preferably rectangular in shape, as shown in Figs. 1 and 2 of the drawings.

The frame 15 is provided at its upper portion with two parallel side rails 16, which are supported intermediate of their ends by means of uprights 17 located some distance forwardly of the middle of the said rails.

Horizontally journaled on one of the standards or uprights 17 at a suitable distance below the rail 16 of the main frame is a driving shaft 18, which has on its outer portion a pulley 19 to which power may be applied from any suitable source for driving the conveyer. Horizontally journaled on the other upright 17 is another shaft 20, on which one of the sides of the conveyer-frame is pivotally mounted. This conveyer-frame consists of two parallel side pieces 21 and 22, the former of which is pivotally mounted on the inner portion of the shaft 18 and the latter similarly mounted on the shaft 20, in such a manner that their rear portions will overbalance their front parts.

Transversely journaled in each of the ends of the sides 21 and 22 of the conveyer-frame, in sliding or adjustable journal boxes 23, are shafts 24 and 25, on each of which is mounted a roller 26, around which rollers is extended an endless belt or conveyer 27, which may have on its outer surface a series of pins 28 arranged in diagonally extending rows, as is clearly shown in Fig. 3 of the drawings and for the purpose to be presently explained.

As shown and will be understood by reference to Fig. 1, the journal boxes 23 in which the ends of each of the shafts 24 and 25 are journaled are movably mounted in frames 29 secured to the side pieces of the conveyer-frame, and said boxes may be adjusted by means of screws 30 located in the inner ends of the frames 29 and engaging at their inner ends said boxes. By thus mounting the shafts 24 and 25, it is apparent that they may be moved in either direction by turning the screws 30 so as to tighten or slacken the belt 27 or conveyer, which is wide enough to extend from the inner surface of one of the sides of the conveyer-frame to the inner surface of the other side thereof.

As the conveyer-frame is pivotally mounted on the shafts 18 and 20 so that it may rest in an inclined position, as shown in Fig. 1, and as it is desirable to adjust the inclination of the conveyer and its frame so as to give them a greater or less inclination, a roller 31 is transversely journaled on the rear upper portion of the main frame, to which is secured near each of its ends a connection 32, such as a cord, chain, or the like, which are also united to the rear portion of the conveyer-frame. The roller 31 is provided with a ratchet 33 which coöperates with a pawl 34, pivoted on one of the side rails of the main frame so as to prevent the reverse movement of said roller. The shaft of the roller 31 may be provided with a handle 35 to be used for turning the roller when it is desired to raise or lower the conveyer-frame.

Mounted on that end of the shaft 25 adjacent to the pulley 19 is a pulley 36, around which is extended a belt 37, which also passes over a pulley 38 mounted on the shaft 18 between the pulley 19 and one side of the main frame. The shaft 18 also has mounted thereon a pulley 39, over which passes a belt 40, which is also extended around a pulley 41 mounted on a shaft 42, which is transversely journaled on brackets 43 on the upper portion of the sides of the conveyer-frame, and which shaft has mounted thereon a longitudinally grooved or corrugated roller 44 or feed roller.

Located horizontally in front of the grooved feed roller 44 and secured at its ends to the sides 21 and 22 of the conveyer-frame is a shelf or platform 45 which is slightly forwardly inclined, as shown in Fig. 12, on which the grains will fall from the corrugations of the roller 44 in its rotation and will pass from said shelf onto the conveyer 27, as is apparent.

Mounted on the upper portion of the main frame and extending from one of the side rails 16 to the other thereof is a feed or supply hopper 46, the lower portion of which is inclined towards and extends near the roller 44, and is provided with a gate or door 47 to regulate the supply of the grains to the roller.

Transversely journaled on the upper front portion of the main frame is a shaft 48, which has on one of its ends a pulley 49, to which power may be applied from any suitable source for driving said shaft. This shaft is provided at about its middle with a beveled gear 50, which meshes with a similar gear 51 on the upper end of a shaft 52 which is vertically journaled on cross-pieces 53 on the front portion of the main frame and extends at its lower end some distance below the conveyer. The lower portion of the shaft 52 has mounted thereon two beveled gears 54 and 55, which mesh with beveled gears 56 and 57, respectively, on the front ends of shafts 58 and 59, respectively, which shafts are journaled one above the other at their front ends on a plate 60 secured to the cross-pieces 53 and at their rear ends on a portion 61 of the main frame. The shaft 58 has mounted thereon a brush roller 62, that is, a roller which is provided with bristles, and the shaft 59 has mounted thereon a corrugated roller 63, which corrugations are enlarged in size from about the middle of the roller to or near its lower end, for it will be observed that the rollers 62 and 63 are journaled in parallelism and in inclined positions.

Located directly beneath the roller 63 and supported on legs or braces 64 are a series of receiving hoppers 65, usually three in number, for the reception of the grains or coffee beans after they have been graded by means of the grading roller and brush roller.

Connected at its upper portion to the conveyer-frame and extending from one side to the other thereof is a hopper 66, the lower portion of which is provided with a chute 67, the lower end of which is laterally deflected and extended close to the corrugated roller 63 at about the middle of one of its sides, as is clearly shown in Fig. 2 of the drawings, so as to discharge the coffee grains into the corrugations of said roller.

Located on the rear end of the main frame below the rear end of the conveyer is a hopper 68, for the reception of the round or pea-berry grains of coffee.

Located transversely on the conveyer-frame in front of the feed roller 44, and secured to the sides of said frame, is a bar 69, which is provided with a series of teeth or prongs 70 which are arranged in diagonally disposed rows and are inclined towards the front end of the machine, as will be fully understood by reference to Figs. 1, 4 and 9 of the drawings.

Located transversely across the conveyer-frame and secured to the sides thereof, at proper distances apart at the rear of the feed roller 44, are a series of bars 71, each of which is provided with a series of downwardly and forwardly extending teeth 70 which, as well as the teeth employed on the bar 69, may be of steel wire, round in cross-section, as shown in Fig. 8, or of flat pieces 70ª, as shown in Fig. 7 of the drawings. The teeth or prongs on each of the bars 71 are arranged in longitudinal rows yet in staggered relation with respect to one another, as will be clearly understood by reference to Fig. 5 of the drawings.

While I have shown one bar 69 located in front of the feed roller 44 and three bars 71 located at the rear thereof, yet I do not desire to be limited to said numbers as I may employ more or less if desired. It will be understood that the said bars are so located that the teeth or prongs therein will approximate the upper surface of the belt or conveyer but will not quite touch the same.

The operation of the machine is simple and as follows: By applying power to the pulleys 19 and 49, it is apparent that the conveyer 27 and the brush and grading rollers 62 and 63 will be driven in the directions indicated by the arrows in Figs. 1 and 2 of the drawings, in which operation the coffee grains in their mixed condition will be fed from the supply hopper 46 to the corrugated feed roller 44 from which, in its rotation through its gearing with the shaft 18, the grains will be intermittently dumped or deposited on the inclined shelf or platform 45, from which they will pass onto the inclined and upwardly traveling conveyer 27 and be carried thereby. In this operation, the round or pea-berry grains will, on account of their rotundity, roll down the inclined and moving conveyer, and some of the flat-surfaced beans will also have a tendency to roll or glide down the conveyer when deposited on their rounded surfaces until they reach the teeth on the bars 71, which will have the effect to turn them over so that they will lie on their flat surfaces and thus be carried upwardly until they strike the teeth on the bar 69 when, by reason of the diagonal arrangement of said teeth, they will be caused to move diagonally on the belt, and if any of the flat-surfaced beans should be located so closely together as to hold one or more pea-berry grains, they will be moved by the teeth so as to free said berry beans and allow them to roll down the conveyer. On account of the rotundity of the pea-berry beans they will pass between the pins on the bars 71 and find lodgment in the receiving hopper 68 therefor. After the flat-surfaced beans have passed forwardly beyond the bar 69 they will be deposited in the hopper 66 and pass therefrom through the chute 67 onto the corrugations of the grading roller 63, and as it rotates they will be carried upwardly so that the brush 62 will act on them in such a manner as to turn their convex surfaces downwardly, thus permitting them to glide down the inclined corrugations of the grading roller 63, in which operation, as said roller further rotates, the smaller beans will be deposited in the hopper 65 at the upper portion of the grading roller, and the beans of another size deposited in the hopper adjacent to the first-named one, and the largest of the beans deposited in the hopper at the lower end of the grading roller. In the foregoing operation, it will be understood that the teeth or spikes 28 on the conveyer 27 will pass between the teeth of the bars 69 and 71 and will remove from the latter, lint, ravelings and strings contained in the mixed coffee from the bags in which it is shipped and which may cling to said teeth.

Having thus fully described my invention what I claim as new and desire to secure by Letters-Patent, is—

1. In a machine of the character described, the combination with the main frame, of a conveyer-frame adjustably mounted thereon, an endless conveyer mounted to travel in said conveyer-frame and carrying a series of upwardly projecting pins arranged in a row across the same, a feed hopper mounted on the main frame above the conveyer, one or more bars transversely located on the conveyer-frame at the rear of the feed hopper and having downwardly and forwardly extending teeth arranged in staggered relation to one another, and means to drive the conveyer, substantially as described.

2. In a machine of the character described, the combination with the main frame, of a conveyer-frame adjustably mounted thereon in an inclined position, an endless conveyer mounted to travel in said conveyer-frame and carrying a series of upwardly projecting pins arranged in a row across the same, a hopper mounted on the upper portion of the main frame, a bar located transversely across the conveyer-frame and having downwardly and forwardly inclined teeth or prongs arranged in diagonally disposed rows, and means to drive the conveyer, substantially as described.

3. In a machine of the character described, the combination with the main frame, of a conveyer-frame adjustably mounted thereon in an inclined position, an endless conveyer mounted to travel in said conveyer frame and carrying on its outer surface a series of spaced apart and outwardly projecting pins arranged across the same in diagonally disposed rows, a hopper mounted on the main frame above the conveyer, a bar located transversely on the conveyer-frame in front of the hopper and having forwardly and downwardly inclined prongs or teeth arranged in diagonally disposed rows, one or more bars transversely located on the conveyer-frame at the rear of the hopper and having downwardly and forwardly extending teeth or prongs arranged in staggered relation with respect to one another, and means to drive the conveyer, substantially as described.

4. In a machine of the character described, the combination with the main frame, of a corrugated roller and a brush roller journaled in parallelism in inclined positions on said frame, a hopper supported on the main frame and having a chute communicating at its lower end with the corrugations of said corrugated roller, the said corrugations being enlarged towards the lower portion of the roller, means to drive the said rollers, and receptacles located below the corrugated roller to receive the grains therefrom, substantially as described.

5. In a machine of the character described, the combination with the main frame, of a conveyer-frame adjustably mounted thereon in an inclined position, a conveyer mounted to travel in the conveyer-frame, a supply hopper mounted on the main frame above the conveyer, a longitudinally corrugated feed roller transversely journaled above the conveyer, a corrugated grading roller longitudinally journaled in an inclined position on the main frame, a brush roller longitudinally journaled in parallelism with the grading roller, the corrugations of the grading roller being enlarged towards the lower portion of said roller, means to drive the conveyer and feed roller, and means to rotate the grading and brush rollers, substantially as described.

JAY JENKINS.

Witnesses:
CHAS. C. TILLMAN,
M. A. NYMAN.